United States Patent
Ramaswamy et al.

(10) Patent No.: US 6,490,560 B1
(45) Date of Patent: Dec. 3, 2002

(54) METHOD AND SYSTEM FOR NON-INTRUSIVE SPEAKER VERIFICATION USING BEHAVIOR MODELS

(75) Inventors: Ganesh N. Ramaswamy, Ossining, NY (US); Upendra V. Chaudhari, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,057

(22) Filed: Mar. 1, 2000

(51) Int. Cl.[7] .................... G10L 17/00; G10L 21/06; G10L 15/22
(52) U.S. Cl. ............ 704/250; 704/273; 704/231; 704/246
(58) Field of Search .................. 704/243, 236, 704/273, 244, 250, 231, 246

(56) References Cited

U.S. PATENT DOCUMENTS

| | | | |
|---|---|---|---|
| 4,752,958 A | * 6/1988 | Cavazza et al. | 704/246 |
| 5,621,889 A | * 4/1997 | Lermuzeaux et al. | 704/273 |
| 5,684,924 A | * 11/1997 | Stanley et al. | 704/244 |
| 5,960,399 A | * 9/1999 | Barclay et al. | 704/243 |
| 6,119,084 A | * 9/2000 | Roberts et al. | 704/243 |
| 6,272,463 B1 | * 8/2001 | Lapere | 704/243 |

OTHER PUBLICATIONS

Navratil et al ("An Instantiable Speech Biometrics Module With Natural Language Interface: Implementation In The Telephony Environment"), Proceedings. 2000 IEEE International Conference on Acoustics, Speech, and Signal Processing, Jun. 5–9, 200.*

U.S. Patent Application Ser. No.: 09/431,034 filed Oct. 9, 1999 "AdaptIVE Command Predictor and Method for a Natural Language Dialog System".

* cited by examiner

Primary Examiner—Richemond Dorvil
Assistant Examiner—Daniel A. Nolan
(74) Attorney, Agent, or Firm—F. Chau & Associates, LLP

(57) ABSTRACT

A system and method for verifying user identity, in accordance with the present invention, includes a conversational system for receiving inputs from a user and transforming the inputs into formal commands. A behavior verifier is coupled to the conversational system for extracting features from the inputs. The features include behavior patterns of the user. The behavior verifier is adapted to compare the input behavior to a behavior model to determine if the user is authorized to interact with the system.

6 Claims, 2 Drawing Sheets

METHOD AND SYSTEM FOR NON-INTRUSIVE SPEAKER VERIFICATION USING BEHAVIOR MODELS

BACKGROUND OF THE INVENTION

1. Field of the Invention

The present invention relates to natural language understanding systems, and more particularly to a method and system for non-intrusively verifying a user based on behavior of the user.

2. Description of the Related Art

Traditional methods for speaker verification (or identification) rely on specific inputs from the user for the sole purpose of the verification. These methods may include providing speech samples and answering biometric questions. Once verified, the speaker is permitted to access the target system, and typically no further verification is performed. Even if additional verification is performed, it requires more specific inputs from the user for the purpose of verification. This is intrusive to the user.

Prior art speaker verification systems (or user verification systems, for systems without a spoken input modality) validate the identity of a given user on the basis of one or more of the following criteria:

1. Who the user is, which may be determined by the user's voice, fingerprint, handwriting, etc.
2. What the user knows, which may be determined by a password, or answers to some biometric questions (e.g., what is the mother's maiden name?), etc.
3. What the user possesses, such as an identification document, a key, a cellular phone with a particular number, etc.

All of the above methods for verification may be defeated if an imposter knows or possesses the information, such as the key or a maiden name, etc.

Therefore, a need exists for a method and system for determining an identity of a user based on the users behavior. A further need exists for a non-intrusive user verification system.

SUMMARY OF THE INVENTION

A system for verifying user identity, in accordance with the present invention, includes a conversational system for receiving inputs from a user and transforming the inputs into formal commands. A behavior verifier is coupled to the conversational system for extracting features from the inputs. The features include behavior patterns of the user.

The behavior verifier is adapted to compare the input behavior to a behavior model to determine if the user is authorized to interact with the system.

In alternate embodiments, the conversational system may include a natural language understanding unit for interpreting speech received as the inputs. The inputs may include at least one of speech, handwriting, text, and gestures. The behavior verifier may include a feature extractor for extracting feature vectors from the inputs.

The feature vectors may include at least one of language model scores, acoustic model scores, natural language and understanding scores, command predication scores and/or pronunciation scores. The feature vectors may include at least one of information about system responses to the user, duration between user commands and a dialog state between the user and the system, and/or types of input modalities employed by the user. The behavior model may include a plurality of models. The behavior verifier may include a probability calculator. The probability calculator may be adapted to calculate a first probability that the user is authorized to interact with the system based on the user's behavior. The behavior verifier may include a model constructor for constructing the behavior model for a user, the behavior model being employed by the probability calculator to compare behavior to current behavior of the user. The system may further include an acoustic and biometric verifier for determining acoustic and biometric information from the user and determining a second probability that the user is authorized to interact with the system based on the user's acoustic or biometric information, and the behavior verifier may include a probability mixer adapted for integrating the first probability with the second probability to verify that the user is authorized to interact with the system. The first probability may be compared to a threshold probability to determine if the user is authorized to use the system.

A method for verifying a user based on behavior, in accordance with the present invention, includes the steps of providing inputs to a conversational system for receiving the inputs from a user and transforming the inputs into formal commands, extracting features from the inputs, the features including behavior patterns of the user, and comparing the input behavior to a behavior model to determine if the user is authorized to interact with the system.

In other methods, the conversational system may include a natural language understanding unit, and the method may further include the step of interpreting speech received as the inputs. The inputs may include at least one of speech, handwriting, text, and gestures. The feature vectors may include at least one of language model scores, acoustic model scores, natural language and understanding scores, command predication scores and/or pronunciation scores. The feature vectors may include at least one of information about system responses to the user, duration between user commands and a dialog state between the user and the system, and/or types of input modalities employed by the user. The behavior verifier may include a probability calculator, and the method may include the step of calculating a first probability on the probability calculator, the first probability for indicating whether the user is authorized to interact with the system based on the user's behavior.

In still other methods, the behavior verifier may include a model constructor, and the method may include the step of constructing the behavior model for a user, the behavior model being employed by the probability calculator to compare behavior to current behavior of the user. An acoustic and biometric verifier may be included for determining acoustic and biometric information from the user, and the method further include the steps of determining a second probability for indicating whether the user is authorized to interact with the system based on the user's acoustic or biometric information and integrating the first probability with the second probability, by employing a probability mixer, to verify that the user is authorized to interact with the system. The first probability may be compared to a threshold probability to determine if the user is authorized to use the system. The methods and method steps of the present invention may be implemented by a program storage device readable by machine, tangibly embodying a program of instructions executable by the machine to perform the method steps for verifying a user based on behavior.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a method and system for continuously verifying the identity of the user based on how the user interacts with a target system. This may be performed by comparing the user's current behavior with past behavior. No additional dedicated input (beyond what is used for the initial verification) from the user is needed, and therefore the system is non-intrusive. Furthermore, verification can be done continuously, and if enough evidence is available for rejecting the user in the middle of a session, then the user can be cut-off before-more damage is done.

In alternate embodiments, even the initial verification is not necessary, and all users may be given base level access (to non-confidential information, for example), and upon additional verification through the non-intrusive process, full access may be given.

In the present invention, a new, dimension to the speaker (or user) verification paradigm is provided, by introducing a new criterion: how the user behaves. For example, a user who usually greets with a "Howdy", may be distinguished from an imposter who greets with a "Hello" or a "How are you", or from an imposter who begins the conversation without any greetings. Similarly, an imposter who is trying to search through several confidential documents may be distinguished from a legitimate user who does not typically perform such searches. Although any one single interaction with the system may be insufficient to make a decision, information gathered after several user-system interactions may be sufficient to make a valid verification decision.

One of the advantages of the present invention is that the speaker verification is non-intrusive, in the sense that no additional dedicated input from the user is expected for the sole purpose of verification, and the user may interact with the system as usual, with the information needed for the verification being gathered automatically by a background process. The comparison of the user's current behavior with known past behavior is also completed automatically by the system without any intrusion or inconvenience to the user.

Figure 1:
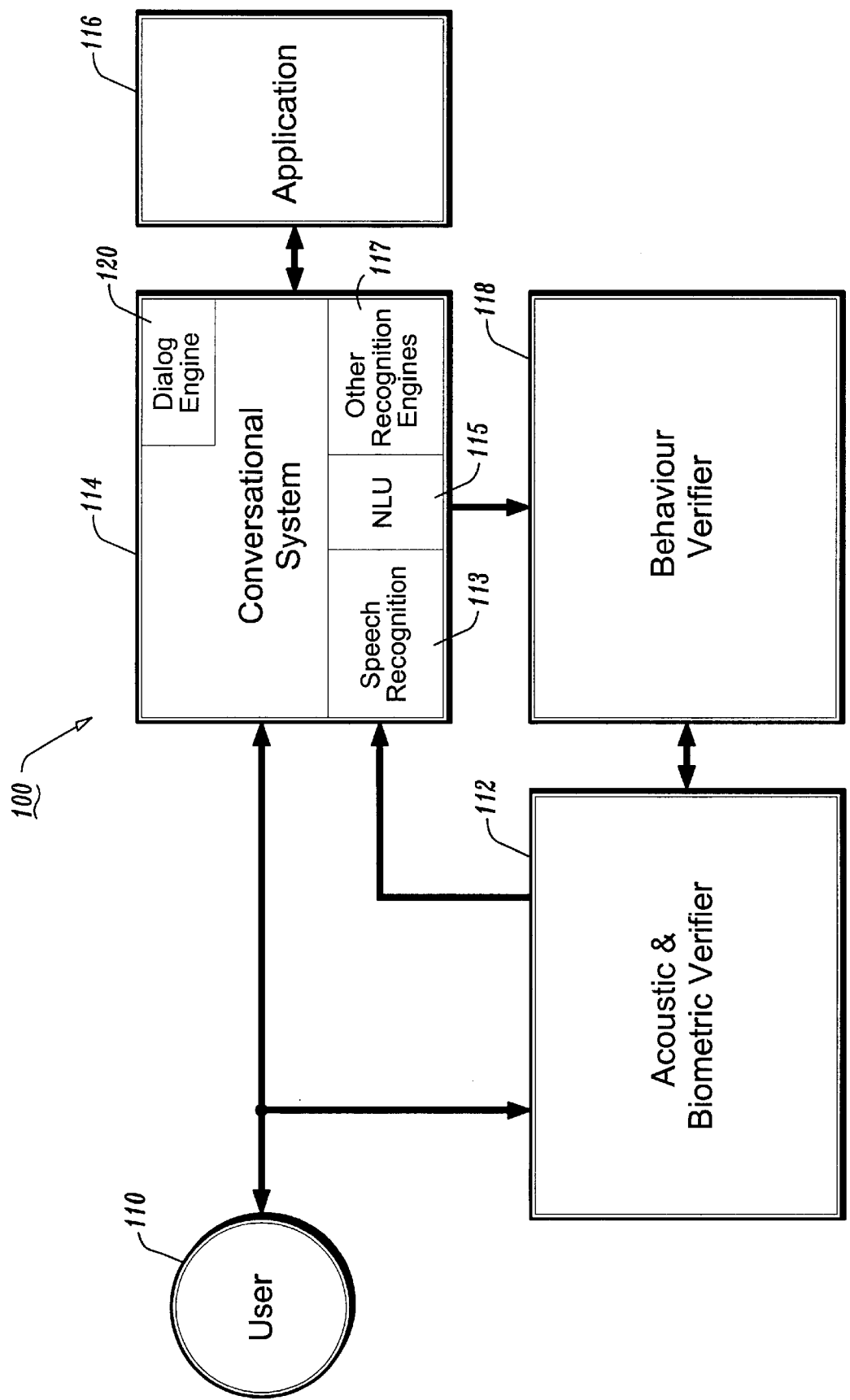
FIG. 1 is a block/flow diagram of an illustrative system/method employing behavior verification in accordance with the present invention.
Figure 2:
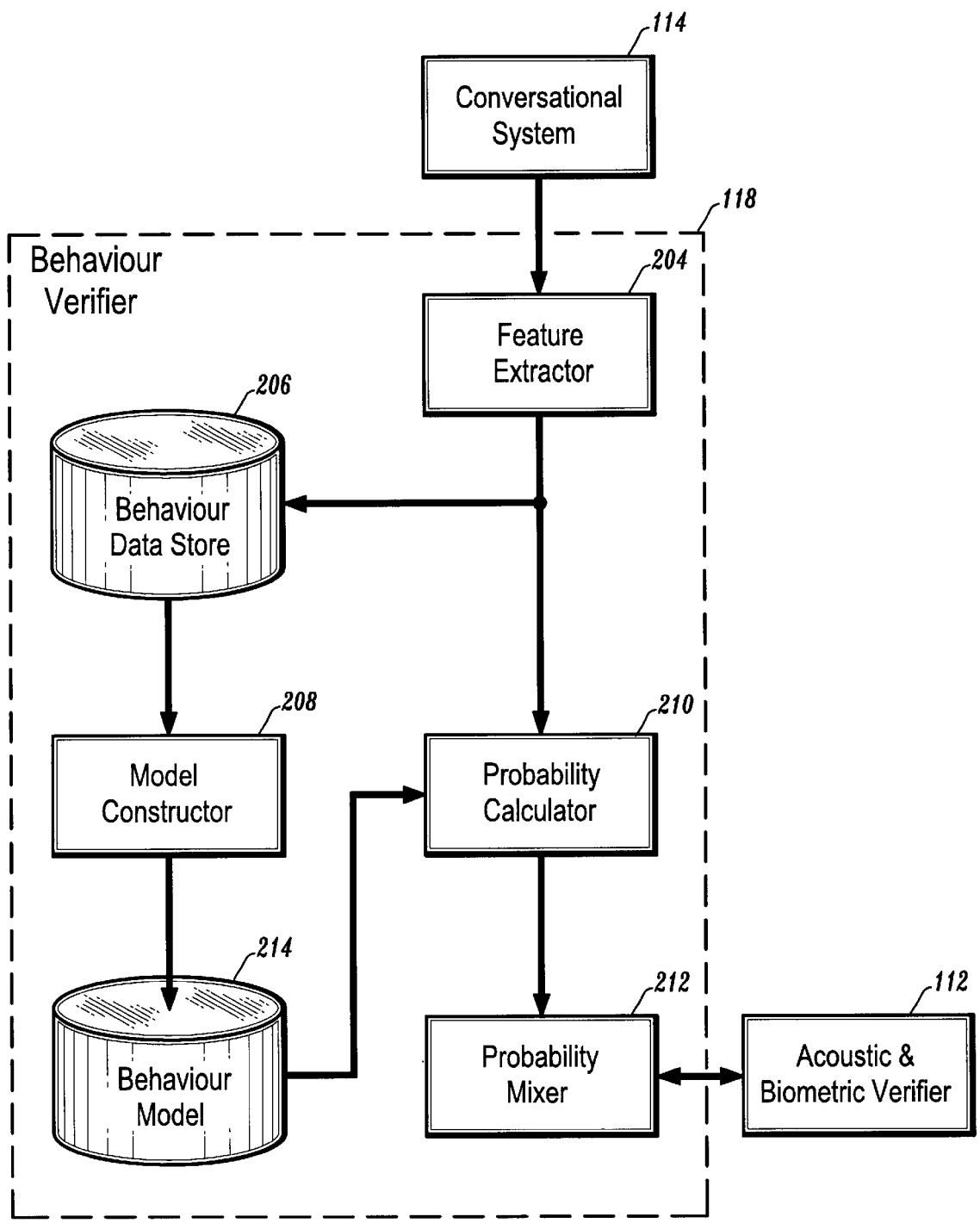
FIG. 2 is a block diagram of an illustrative behavior verifier in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, an illustrative system/method for employing behavior verification is shown in accordance with the present invention. A target system 100, for which speaker verification is needed, is preferably capable of providing some parameters related to how a user 110 interacts with the system. For example, the system 100 may permit the user 110 to interact with the system using several different input modalities, such as typed text, spoken utterance, handwritten input, gestures, etc. Technologies such as speech recognition, handwriting recognition and image recognition, along with natural language understanding and dialog management may be used by the system 100 to interpret the user input and translate it to a form suitable for execution by the computer or computers of system 100. The system 100 may connect to a number of different applications 116, such as electronic mail, electronic calendar, banking, stock or mutual funds trading, travel services, spreadsheets, editing programs, etc., and allow the user to interact with these applications. System 100 may also provide the parameters needed to describe how the user interacts with the system, such as parameters related to speech recognition or natural language understanding.

As shown in FIG. 1, an example of the system 100 is shown including a behavior verifier 118. The input from the user 110 is expected to be a spoken utterance, but it may be in some other modality, such as a handwritten input, typed text, or gesture. When spoken input is used, a conversational system 114 first converts the spoken utterance into text using a speech recognition engine 113, which is known in the art. For example, if the application 116 is an electronic mail application, then the user might say, "do I have any new messages," and the spoken utterance is converted to the corresponding text string by the speech recognition engine. Inputs, not in spoken form, such as handwritten input, are also converted to the corresponding text string using appropriate technology, such as-for example a handwriting recognition engine 117, known in the art. This is true for interpreting gestures or other modalities. An appropriated recognition engine, is employed. In this way, all inputs are converted to a recognizable form which is understood to system 100.

The text string or other formatted signal is then analyzed by a natural language understanding (NLU) engine 115 to be converted to a formal command, suitable-for execution by the system 100 within the application 116. For example, sentences such as "do I have any new messages" or "can you check my mailbox," both of which carry the same meaning, may be translated to a formal command of the form: checkNewMail( ). The formal command is then submitted to the application 116 for execution of the command. A dialog engine 120 or dialog manager may also be used to manage the dialog with the user, and to perform certain other functions such as ambiguity resolution.

The conversational system may therefore include speech and other input recognition engines, Natural Language Understanding (NLU) engine 115, and dialog engine 120. Methods for building a conversational system are known in the art.

An acoustic and biometric verifier 112 is included in system 100. Acoustic and biometric verifier 112 is responsible for identifying and verifying the identity of the user 110. The verification is nominally performed prior to allowing the user 110 to access the system 100. The verification process may include matching an acoustic signature of the person claiming to be a given user to the known acoustic signature of the claimed user, which is an acoustic verification process. The verification process may also include biometric verification whereby the person claiming to be the user is prompted for answers to specific questions, such as a password, mother's maiden name, social security number, etc. Methods for acoustic and biometric verification are well known in the art.

Behavior verifier 118, in accordance with the present invention, is responsible for performing additional verification of the user's identity continuously during usage. Details of behavior verifier are described below with reference to FIG. 2. Behavior verifier 118 receives inputs from both the conversational system 114 and the acoustic and biometric verifier 112, and provides its output to the acoustic and biometric verifier 112.

Referring to FIG. 2, a feature extractor 204 is responsible for extracting a set of features from the data provided by the conversational system 114, and constructing a feature vector v, which includes n features.

$$v=[v_1 \ldots v_n] \quad (1)$$

The value of n should be chosen by a system designer, and may depend on the type of accuracy and/or type of recognition needed for the system. The features $v_1 \ldots v_n$ extracted by feature extractor 204 may include one or more of the following features, or other similar features. The following features list is illustrative and not to be construed as limiting the present invention. Further, the features described herein may be used alone or in combination with other features to determine an appropriate feature vector(s) in accordance with the invention. The features may include one or more of:

1) Language model scores: Speech recognition engines use a language model, or a set of language models, to perform the recognition. When more than one language model is used, some of the models may be personalized to a given user (sometimes known as the personal cache, built using words and phrases spoken frequently by a given user). Language model scores are generated and used internally, and discarded after the recognition is complete. However, these scores carry information that can characterize the user, particularly with respect to the choice of words and phrases often used. For example, if a user normally says "begin dictation," then an imposter who says "let us create the text for this message" can be detected. Similarly, a user who normally issues commands using brief and to-the-point phrases may be distinguished from an imposter who uses long sentences. Therefore, the language model scores may be saved and incorporated as features in the feature vector. It should be noted that an imposter need not be rejected based on a single phrase or phrases. Instead a cumulative behavioral score can be maintained for a given user session and periodically checked against a threshold to determine if the user is an imposter or not verified for using the system.

2) Acoustic model scores: Acoustic model scores (sometimes known as fast match scores and detailed match scores) and other intermediate outputs are used internally within the speech recognition engine, and discarded after the recognition. Similar to the language model scores, the acoustic model scores also include information relevant to characterizing a user, and any deviation from the normal range of scores for a given task may be detected and used to identify an imposter. Hence, it is useful to add the acoustic model to the feature vector.

3) Natural language understanding (NLU) scores: The NLU engine also generates internal scores which are discarded after the translation from text-to-formal command is complete. These scores also include information that may be useful in characterizing the user. The NLU engine usually includes two or more stages (such as a tagging stage and a translation stage), and all of these scores may be added to the feature vector so that any deviation from the normal range of scores for a given task may be detected.

In addition to these scores, other inputs such as the second choice of the formal command, or the second choice of tagged sentence from the intermediate stage of tagging may also be encoded as features. For example, a user may say "Open Steve," which may result in top-ranking formal command OpenMessage (name=Steve), corresponding to opening the message from Steve, and a second choice formal command OpenFolder (folder=Steve), corresponding to opening a folder called Steve. However, an imposter may be more clear, and say something like "Open the message from Steve," in which case the first choice formal command would likely be the same, but the second choice command may be different.

4) Command prediction scores: Users often exhibit a pattern in the sequence of commands which the users issue and the combination of commands frequently used to accomplish a task. A system that predicts the user's next command based on past behavior, such as the one described in commonly assigned U.S. patent application No. 09/431,034 entitled "Adaptive Command Predictor for a Natural Language Dialog System," to G. Ramaswamy and J. Kleindienst, filed on Oct. 30, 1999 and incorporated herein by reference, may be used to improve the accuracy of the conversational system and also for the system to take initiative and suggesting the next command to the user. However, in addition to these applications, the scores generated by the command prediction system are also useful in detecting an imposter. If a person issues a command that has never been used by the actual user (and hence will get a low command prediction score), or if the person issues a series of commands that were not part of the top ranking predicted commands (again the command prediction scores will be low), then the usual command or sequence of commands may indicate the presence of an imposter. Therefore, the command prediction scores are good features to be added to the feature vector.

5) Pronunciation Model: In most languages, there are certain words with more than one pronunciation. For example, in English, the word "the" has the following common pronunciation.

| | |
|---|---|
| the | \|DH AH |
| the | \|DH AX |
| the | \|DH IY |

Most users often use only one pronunciation for these words. An imposter who is unaware of the user's preferred pronunciation for certain words may use an alternative pronunciation. To detect the imposter in this case, the feature vector may include a set of features that encode the pronunciation used for these words.

6) Other input scores: If the system supports other input modalities such as handwriting recognition or image recognition, then the scores from these recognition engines can also be added to the feature vector, similar to the language model and acoustic model scores from speech recognition.

7) System responses: Conversational systems not only accept spoken inputs from the user, but they maintain a dialog with the user and generate responses to be presented to the user. The system of the present invention may look at what responses the system typically generates for a user, and may use that information to detect an imposter. Responses such as "I could not find that message,""there is no such meeting," or "you do not own any shares in that mutual fund," could mean that the user has no knowledge of prior interactions with the system and could potentially be an imposter. Similarly, some users are very precise and may issue commands such as "send this to Steve Jones," which may not require additional clarification, but other users may be vague and issue the same command as "send this to Steve," which may require additional dialog for disambiguation. The system may prompt the user with a question of the form "do you mean Steve Jones or Steve Brown?". In this case, an imposter who is more precise or more vague than the actual user may be detected.

To use the system responses as feature in the feature vector, the standard system responses may be put in different categories (negative responses, positive responses, confirmation, clarification, etc.), and the identification of the category may be entered as a feature when a response is generated.

8) Multi-modal interaction model: For systems that support multi-modal inputs (speech, keyboard, mouse, handwriting, gesture, etc.), the combinations of the input modalities that the user typically uses may be analyzed in accordance with the present invention to accomplish a task, and detect an imposter who is using a different set of input modalities for the same task. For example, some users may prefer to click the "save" button to save a file, while others may prefer to use a spoken command for this task. Hence, it is useful to add the input modalities used to accomplish a certain task as additional features in the feature vector.

9) Dialog state: Some systems may permit the user to have multiple transactions being open at any given time (the user does not have to finish one task before moving to the next one). In this case, features can be added representing the number of transactions currently open, and the time that has passed since the oldest transaction started. This information may again be used to construct feature vectors which typify a given user. Dialog state may also include the type or duration of use of activities performed on the system. For example, a particular user may always access e-mail when logging onto a system then check stock prices.

10) Duration between commands: Different users may interact with the system at different rates. However, a given user often exhibits regularities in the duration between commands, e.g., the time the user pauses between commands. Therefore, the duration between the end of the last command and the start of the present command may be entered explicitly as a feature.

All of the above features describe how the user may interact with the system. Additional features that may be available may also be characteristic of how a given user behaves. These additional features may be tailored by the system of the user at, for example, initialization of the system and may also be appended to the feature vector v.

The conversational system 114 provides all the data needed to calculate v.

The feature extractor 204 extracts the feature vector v for every input from the user and sends it to both a behavior data store 206 and a probability calculator 210. The behavior data store 206 is used to store all the feature vectors collected for a particular user, and is used by a model constructor 208 to build a behavior model 214 for each authorized user. In one embodiment of the present invention, a simple behavior model is constructed, including only the mean vector m and the covariance matrix $\Sigma$ for the set of feature vectors (v's). In this case, the model constructor 208 calculates the mean vector m and the covariance matrix $\Sigma$ for a given user, when a sufficient number of samples of the feature vector v have been collected. The process is repeated periodically when a sufficient number of additional feature vectors are collected. The mean vector m and the covariance matrix $\Sigma$ are stored in the behavior model 214. Calculation of mean vectors and covariance matrices are known in the art. The feature vectors are continuously collected and the behavior model 214 is updated at periodic intervals, to accommodate for any gradual changes in the user's behavior.

The probability calculator 210 then calculates the probability P given, for example, by:

$$P = \frac{e^{-\frac{1}{2}(v-m)^T \Sigma^{-1}(v-m)}}{(2\pi)^{\frac{n}{2}} |\Sigma|^{\frac{1}{2}}}, \quad (2)$$

describing the likelihood that the given input could have come from the correct user, based on the behavior model 214. Higher values of P will correspond to greater likelihood that the input came from the correct or authorized user.

A probability mixer 212 takes the probability scores P and performs two steps. First, it calculates the weighted average of the probability scores P from EQ. (2) for the current input and a selected number of previous inputs. If the probability score for the current input is denoted as P(t), and the score for the $i^{th}$ previous input as P(t-i) for $i=1, \ldots, m$, where m is the total number of prior inputs to be considered, then the probability mixer 212 may calculate the cumulative behavior score at the current instance, $P_b(t)$, given by $$P_b(t) = \alpha_t P(t) + \alpha_{t-1} P(t-1) + \ldots + \alpha_{t-m} P(t-m) \quad (3)$$

where the non-negative weights $\alpha_i$'s satisfy $\alpha_t + \alpha_{t-1} + \ldots + \alpha_{t-m} = 1$ and $\alpha_t \geq \alpha_{t-1} \geq \ldots \geq \beta_{t-m} \geq 0$. The value of m is a system parameter that determines the number of previous probability scores to be considered, and may be chosen by the system designer. The intent of taking the average over several scores is to ensure that no single spurious score causes an incorrect decision to be made.

The second step to be performed by the probability mixer 212 is to further mix the behavior score $P_b(t)$ with an acoustic score (and/or biometric score) $P_\alpha(t)$ for the current input provided by the acoustic and biometric verifier 112 (FIG. 1). The acoustic score $P_\alpha(t)$ may be a standard acoustic score used in speaker verification, and may be calculated using the speech samples from the current user input, if the current user input is in spoken form (if the current input is not in spoken form, then other approximations, such as setting $P_\alpha(t) = P_{60}(t-1)$ or to the acoustic score from the most recent past spoken input may be used). The probability mixer 212 calculates the overall score, $P_{total}(t)$, given by $$P_{total}(t) = \beta_\alpha P_b(t) \quad (4)$$

where the non-negative weights $\beta_i$'s satisfy $\beta_\alpha + \beta'_b = 1$, which may be chosen by the system designer, but may be later modified by the user based on his or her preferences.

The probability mixer 212 compares the value of $P_{total}(t)$ to a predetermined threshold $P_{th}$ and if $P_{total}(t) < P_{th}$, then a message is sent to the acoustic and biometric verifier 112 that the user may be an imposter. In one embodiment, the acoustic and biometric verifier 112 interrupts the user and asks the user to go through a more thorough verification process. If the additional verification fails, the user may no longer be permitted to use the system. If the additional verification is successful, then the user is permitted to interact with the system, until a future warning message is generated by the probability mixer 212.

In another embodiment, the user is permitted to continue to interact with the system, but is denied access to sensitive materials on the system. The material's sensitivity may include levels and the levels of access to sensitive materials may be based on a score relative to the threshold. For example, a group of employees may be permitted to access a system, however, some employees must be excluded from sensitive materials. The behavior of the employees may be employed to exclude non-authorized employees from the sensitive materials.

The threshold $P_{th}$ is a system parameter which may be chosen by the system designer. However, the threshold can be modified by the user according to the desired level of performance.

Another embodiment of the present invention will now be described. The model constructor 208 constructs two or more models and the collection is stored in the behavior model 214. To construct each of these models, the collection of feature vectors v is first partitioned into a number of clusters, using any standard clustering algorithm such as, for example, the well known K-means clustering algorithm. For each cluster i, the mean vector mi and the covariance matrix $\Sigma_i$ are calculated, and EQ. (2) is now modified to be $$P = \max_i \left[ \frac{e^{-\frac{1}{2}(v-m_i)^T \Sigma_i^{-1}(v-m_i)}}{(2\pi)^{\frac{n}{2}} |\Sigma_i|^{\frac{1}{2}}} \right] \quad (5)$$

The equations (3) and (4) remain the same, but they will use the value of P calculated from equation (5) above. The purpose of constructing clusters of feature vectors is to accommodate different behaviors that may be exhibited by the same user at different times, corresponding for example to different tasks or different devices being used. Accordingly, instead of using the clustering algorithm, the clusters may be constructed explicitly on the basis of factors related to the interaction, such as the application being accessed (email, calendar, stock trading, etc.), the access device (telephone, cellular phone, notebook computer, desktop computer, personal digital assistant, etc.) or some other factor.

Having described preferred embodiments of a method and system for non-intrusive speaker verification using behavior models (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for verifying user identity comprising:
   a conversational system for receiving inputs from a user and transforming the inputs into formal commands;
   a behavior verifier coupled to the conversational system for extracting features from the inputs, the features including behavior patterns of the user, the behavior verifier including a probability calculator, the probability calculator being adapted to calculate a first probability that the user is authorized to interact with the system based on the user's behavior;
   an acoustic and biometric verifier for determining acoustic and biometric information from the user and determining a second probability that the user is authorized to interact with the system based on the user's acoustic or biometric information; and
   the behavior verifier including a probability mixer adapted for integrating the first probability with the second probability to verify that the user is authorized to interact with the system.

2. A method for verifying a user based on behavior comprising the steps of:
   providing inputs to a conversational system for receiving the inputs from a user and transforming the inputs into formal commands;
   extracting features vectors from the inputs by a behavior verifier including a feature extractor, the feature vectors including behavior patterns of the user and information about system responses to the user; and
   comparing the feature vectors to a behavior model to determine if the user is authorized to interact with the system.

3. A method for verifying a user based on behavior comprising the steps of:
   providing inputs to a conversational system for receiving the inputs from a user and transforming the inputs into formal commands;
   extracting features from the inputs by a behavior verifier, the features including behavior patterns of the user;
   calculating a first probability on a probability calculator, the first probability for indicating whether the user is authorized to interact with the system based on the user's behavior;
   determining acoustic and biometric information from the user by an acoustic and biometric verifier;
   determining a second probability for indicating whether the user is authorized to interact with the system based on the user's acoustic or biometric information; and
   integrating the first probability with the second probability, by employing a probability mixer, to verify that the user is authorized to interact with the system.

4. A program storage device readable by machine, tangibly embodying a program of instructions executable by the machine to perform method steps for verifying a user based on behavior, the method steps comprising:
   providing inputs to a conversational system for receiving the inputs from a user and transforming the inputs into formal commands;
   extracting features vectors from the inputs by a behavior verifier including a feature extractor, the feature vectors including behavior patterns of the user and information about system responses to the user; and
   comparing the feature vectors to a behavior model to determine if the user is authorized to interact with the system.

5. A program storage device readable by machine, tangibly embodying a program of instructions executable by the machine to perform method steps for verifying a user based on behavior, the method steps comprising:
   providing inputs to a conversational system for receiving the inputs from a user and transforming the inputs into formal commands;
   extracting features from the inputs by a behavior verifier, the features including behavior patterns of the user;
   calculating a first probability on a probability calculator, the first probability for indicating whether the user is authorized to interact with the system based on the users behavior;
   determining acoustic and biometric information from the user by an acoustic and biometric verifier;
   determining a second probability for indicating whether the user is authorized to interact with the system based on the user's acoustic or biometric information; and integrating the first probability with the second probability, by employing a probability mixer, to verify that the user is authorized to interact with the system.

6. A system for verifying user identity comprising:

a conversational system for receiving inputs from a user and transforming the inputs into formal commands; and a behavior verifier including a feature extractor coupled to the conversational system for extracting feature vectors from the inputs, the feature vectors including behavior patterns of the user and information about system responses to the user, the behavior verifier being adapted to compare the feature vectors to a behavior model to determine if the user is authorized to interact with the system.

* * * * *